US010951048B2

(12) United States Patent
Mizoguchi et al.

(10) Patent No.: US 10,951,048 B2
(45) Date of Patent: Mar. 16, 2021

(54) CHARGING CIRCUIT

(71) Applicant: FDK CORPORATION, Tokyo (JP)

(72) Inventors: Yasunari Mizoguchi, Tokyo (JP); Kazuta Takeno, Tokyo (JP); Kunihisa Sekiguchi, Tokyo (JP); Kenji Kitamura, Tokyo (JP); Takashi Kano, Tokyo (JP)

(73) Assignee: FDK CORPORATION, Tokyo (JP)

( * ) Notice: Subject to any disclaimer, the term of this patent is extended or adjusted under 35 U.S.C. 154(b) by 254 days.

(21) Appl. No.: 16/073,316

(22) PCT Filed: Jan. 27, 2017

(86) PCT No.: PCT/JP2017/002956
§ 371 (c)(1),
(2) Date: Jul. 26, 2018

(87) PCT Pub. No.: WO2017/131164
PCT Pub. Date: Aug. 3, 2017

(65) Prior Publication Data
US 2019/0006856 A1 Jan. 3, 2019

(30) Foreign Application Priority Data
Jan. 27, 2016 (JP) .............................. JP2016-013397

(51) Int. Cl.
*H02J 7/00* (2006.01)
*H01M 10/44* (2006.01)
(Continued)

(52) U.S. Cl.
CPC ............. *H02J 7/007* (2013.01); *H01M 10/44* (2013.01); *H01M 10/441* (2013.01);
(Continued)

(58) Field of Classification Search
CPC ............ H02H 7/007; H02H 7/02; H02H 7/04; H02H 7/0013; H01M 10/44;
(Continued)

(56) References Cited

U.S. PATENT DOCUMENTS 5,637,979 A  6/1997 Tamai et al.
6,100,668 A * 8/2000 Takano ................. H02J 7/0071
                                                              320/148
(Continued)

FOREIGN PATENT DOCUMENTS

EP      2270951 A1    1/2011
JP    08-140209 A     5/1996
(Continued)

OTHER PUBLICATIONS

English Translation of International Search Report dated Feb. 21, 2018, for corresponding PCT Application No. PCT/JP2017/002956.
(Continued)

*Primary Examiner* — Richard Isla
*Assistant Examiner* — Michael N Dibenedetto
(74) *Attorney, Agent, or Firm* — Kinney & Lange, P.A.

(57) ABSTRACT

A charging circuit includes a first power source circuit that supplies charging power to secondary batteries; a switch that controls the supply of the power; and a control device that performs switching control of the switch. The control device detects a voltage difference between the secondary batteries before starting charging; starts a timer and starts serial charging of the secondary batteries; on the condition that the voltage difference before the charging has been equal to or larger than a first threshold, if respective voltage values of the secondary batteries have both become equal to or larger than a second threshold before the timer expires, shortens a remaining time on the timer at that time point; and finishes the serial charging of the secondary batteries at the earlier of
(Continued)

a time point when the secondary batteries have both become fully charged, or a time point when the timer has expired.

5 Claims, 2 Drawing Sheets

(51) Int. Cl.
 *H02J 7/02* (2016.01)
 *H01M 10/48* (2006.01)
 *H02J 7/04* (2006.01)

(52) U.S. Cl.
 CPC ....... *H01M 10/446* (2013.01); *H01M 10/482* (2013.01); *H02J 7/0013* (2013.01); *H02J 7/02* (2013.01); *H02J 7/04* (2013.01)

(58) Field of Classification Search
 CPC ............. H01M 10/441; H01M 10/446; H01M 10/448; H01M 2010/4271; H02J 7/1423; H02J 7/0013; H02J 7/0021; H02J 7/0022; H02J 7/0027; H02J 7/0014; H02J 7/0071; H02J 7/0072; H02J 7/0063
 USPC ........................................................ 320/116

See application file for complete search history.

(56) References Cited

U.S. PATENT DOCUMENTS

| | | | | |
|---|---|---|---|---|
| 2008/0218130 | A1* | 9/2008 | Guo ................... | H01M 10/441 320/162 |
| 2011/0080138 | A1* | 4/2011 | Nakanishi ............ | H02J 7/0016 320/116 |
| 2012/0091958 | A1* | 4/2012 | Ichikawa ................ | B60L 50/16 320/109 |
| 2012/0326670 | A1* | 12/2012 | Shook ................. | H01M 10/052 320/116 |
| 2013/0200850 | A1* | 8/2013 | Ke .......................... | H02J 7/007 320/118 |
| 2014/0132224 | A1* | 5/2014 | Pisharodi ................ | H02J 7/027 320/149 |
| 2015/0155722 | A1* | 6/2015 | Kudo .................... | H02J 7/0021 320/116 |
| 2015/0295424 | A1* | 10/2015 | Suzuki .................. | H02J 7/0018 320/116 |
| 2016/0141894 | A1* | 5/2016 | Beaston .................. | H02J 7/342 320/103 |

FOREIGN PATENT DOCUMENTS

| | | |
|---|---|---|
| JP | 2007-250364 A | 9/2007 |
| JP | 2009-254038 A | 10/2009 |

OTHER PUBLICATIONS

Supplementary European Search Report dated Sep. 2, 2019, for corresponding European Application No. 17744394.2, 6 pages.

* cited by examiner

CHARGING CIRCUIT

CROSS-REFERENCE TO RELATED APPLICATIONS

This application is the national phase of PCT Application No. PCT/JP2017/002956 filed on Jan. 27, 2017, which in turn claims priority to Japanese Application No. 2016-013397 filed on Jan. 27, 2016, the entire disclosures of which are incorporated herein by reference.

TECHNICAL FIELD

The present invention relates to a charging circuit for charging secondary batteries.

BACKGROUND

In a charging circuit that simultaneously charges multiple secondary batteries, a charging scheme for serially charging the respective secondary batteries can reduce power source systems for supplying current to the respective secondary batteries, in comparison to a charging scheme for charging in parallel. Serial charging is thus often employed particularly in low-cost charging circuits. Moreover, for example, in an electronic device with built-in secondary batteries that are serially connected, if the secondary batteries are charged without being removed, the serial charging will necessarily be performed. In the serial charging, however, if the charging is attempted until all of the multiple secondary batteries with different charged amounts before the charging are fully charged, overcharged states of the secondary batteries with larger charged amounts before the charging will continue for a long time to promote degradation.

As a conventional technique for the purpose of solving such a problem, there is a publicly known charging device that equalizes the charged amounts of the multiple secondary batteries before performing the serial charging. For example, in a prior art technique disclosed in Patent Document 1 (Japanese Patent Laid-Open No. 2007-250364), a charging circuit that charges two secondary batteries is provided with three switches and configured to be switchable between individual charging and the serial charging of the respective secondary batteries. In addition, the prior art technique disclosed in Patent Document 1 can individually charge only the secondary battery with a lower voltage until a voltage difference between the two secondary batteries becomes approximately the same, while measuring their voltages, and thereby equalize the charged amounts of the two secondary batteries before performing the serial charging. In other words, the prior art technique disclosed in Patent Document 1 starts the serial charging of the two secondary batteries after equalizing the charged amounts of the two secondary batteries through the individual charging, and can thus inhibit the degradation of the secondary batteries as described above.

However, a configuration of switching between the individual charging and the serial charging of the respective secondary batteries requires at least three switches as in the prior art technique disclosed in Patent Document 1, and moreover, its circuit configuration becomes complicated to thereby cause increase in a manufacturing cost of the charging circuit.

SUMMARY

The present disclosure provides, at low cost, a charging circuit that inhibits the degradation due to overcharge even if the multiple secondary batteries with the different charged amounts are serially charged.

In a first aspect of the present disclosure, a charging circuit includes a power source circuit that supplies charging power to multiple secondary batteries; a switch that controls the supply of the charging power from the power source circuit to the multiple secondary batteries; and a control device that performs switching control of the switch based on respective voltage values of the multiple secondary batteries. The control device detects a voltage difference among the multiple secondary batteries before starting charging; the control device starts a timer for setting an upper limit of a charging time, and starts serial charging of the multiple secondary batteries; in a condition that the voltage difference among the multiple secondary batteries before the charging is equal to or larger than a first threshold, if the respective voltage values of the multiple secondary batteries all become equal to or larger than a second threshold before the timer expires, the control device shortens a remaining time on the timer at that time point; and the control device finishes the serial charging of the multiple secondary batteries at the earlier of a time point when the multiple secondary batteries have all become fully charged, or a time point when the timer has expired.

The control device first detects the voltage difference among the respective secondary batteries before the charging, then starts the timer for setting the upper limit of the charging time, and also starts the serial charging of the multiple secondary batteries by turning ON the switch that controls the supply of the power from the power source circuit to the multiple secondary batteries. During the charging of the secondary batteries, if the voltage values of all of the secondary batteries become equal to or larger than the second threshold before the timer expires, in a condition that the voltage difference among the respective secondary batteries detected before the charging has been equal to or larger than the first threshold, the control device shortens the remaining time on the timer at that time point. Here, the first threshold is a threshold that is preset in order to determine whether or not a difference can be recognized in charged amounts of the respective secondary batteries before the charging. Moreover, the second threshold is a threshold for determining whether or not the respective secondary batteries have reached a minimum charged amount to be secured through the charging, and is preset as the voltage values of the secondary batteries in the case where that charged amount has been reached. Then, the control device turns OFF the switch that controls the supply of the power, and thereby finishes the charging at the earlier of the time point when all of the secondary batteries have become fully charged, or the time point when the timer has expired.

If there is a difference equal to or larger than a certain amount, in the charged amounts of the respective secondary batteries before the charging, when the serial charging is performed until all of the secondary batteries are fully charged, an overcharged state of a secondary battery that has been fully charged earlier (a secondary battery with a charged amount larger than other secondary batteries before the charging is started) will continue for a long time to cause a risk of degradation of that secondary battery. The control device thus charges all of the secondary batteries to the minimum charged amount, unless the timer expires earlier, and if there has been the difference equal to or larger than the certain amount, in the charged amounts of the respective secondary batteries before the charging (if the voltage difference among the multiple secondary batteries before the charging has been equal to or larger than the first threshold), the control device shortens the remaining time on the timer at that time point. Thereby, the charging can be finished early so that the overcharged state of the secondary battery with the larger charged amount before the charging will not continue for a long time after the secondary battery has been fully charged. Moreover, the charging circuit requires just one switch that controls the supply of the power to the multiple secondary batteries, and can thereby simplify a circuit configuration with a reduced manufacturing cost.

Thus, according to the first aspect of the present disclosure, as a working effect that can be obtained, it is possible to provide, at low cost, a charging circuit that inhibits the degradation due to overcharge even if the multiple secondary batteries with different charged amounts are serially charged.

A second aspect of the present disclosure is the charging circuit, in the previously described first aspect of the present disclosure, in which the control device sets an amount of remaining time on the timer to be shortened, based on the voltage difference among the multiple secondary batteries before the charging.

The difference in the charged amounts of the multiple secondary batteries before the charging can be inferred from the voltage difference among the respective secondary batteries. Moreover, with a larger difference in the charged amounts of the multiple secondary batteries before the charging, the overcharged state of the secondary battery with the larger charged amount before the charging will be more likely to continue for a long time after the secondary battery has been fully charged. The control device thus sets the amount of remaining time on the timer to be shortened, to be larger with the larger difference in the charged amounts of the multiple secondary batteries before the charging. Thus, according to the second aspect of the present disclosure, as a working effect that can be obtained in addition to the working effect according to the previously described first aspect of the present disclosure, it is possible to provide a charging circuit in which the degradation of the secondary batteries due to the overcharge is more precisely inhibited.

A third aspect of the present disclosure is the charging circuit, in the previously described first or second aspect of the present disclosure, in which the control device sets the amount of remaining time on the timer to be shortened, within a range between an upper limit value and a lower limit value that have been preset.

If the amount of remaining time on the timer to be shortened is too short, a time duration for which the secondary battery that has been fully charged earlier is in the overcharged state will not be sufficiently shortened, and thus an effect of inhibiting the degradation of the secondary battery will be reduced. In contrast, if the amount of remaining time on the timer to be shortened is too long, the charging time becomes too short after the voltage values of all of the secondary batteries have become equal to or larger than the second threshold, and the charging will be more likely to be finished before any of the multiple secondary batteries is fully charged. The control device thus sets the amount of remaining time on the timer to be shortened, within the range between the upper limit value and the lower limit value that have been preset, and thereby all of the multiple secondary batteries can be charged to a fully charged state, while the degradation of the secondary batteries can be more effectively inhibited. Thus, according to the third aspect of the present disclosure, as a working effect that can be obtained in addition to the working effect according to the previously described first or second aspect of the present disclosure, it is possible to provide a charging circuit that maintains the effect of inhibiting the degradation of the secondary batteries, while securing the charged amounts of the secondary batteries as much as possible.

DETAILED DESCRIPTION

Figure 1:
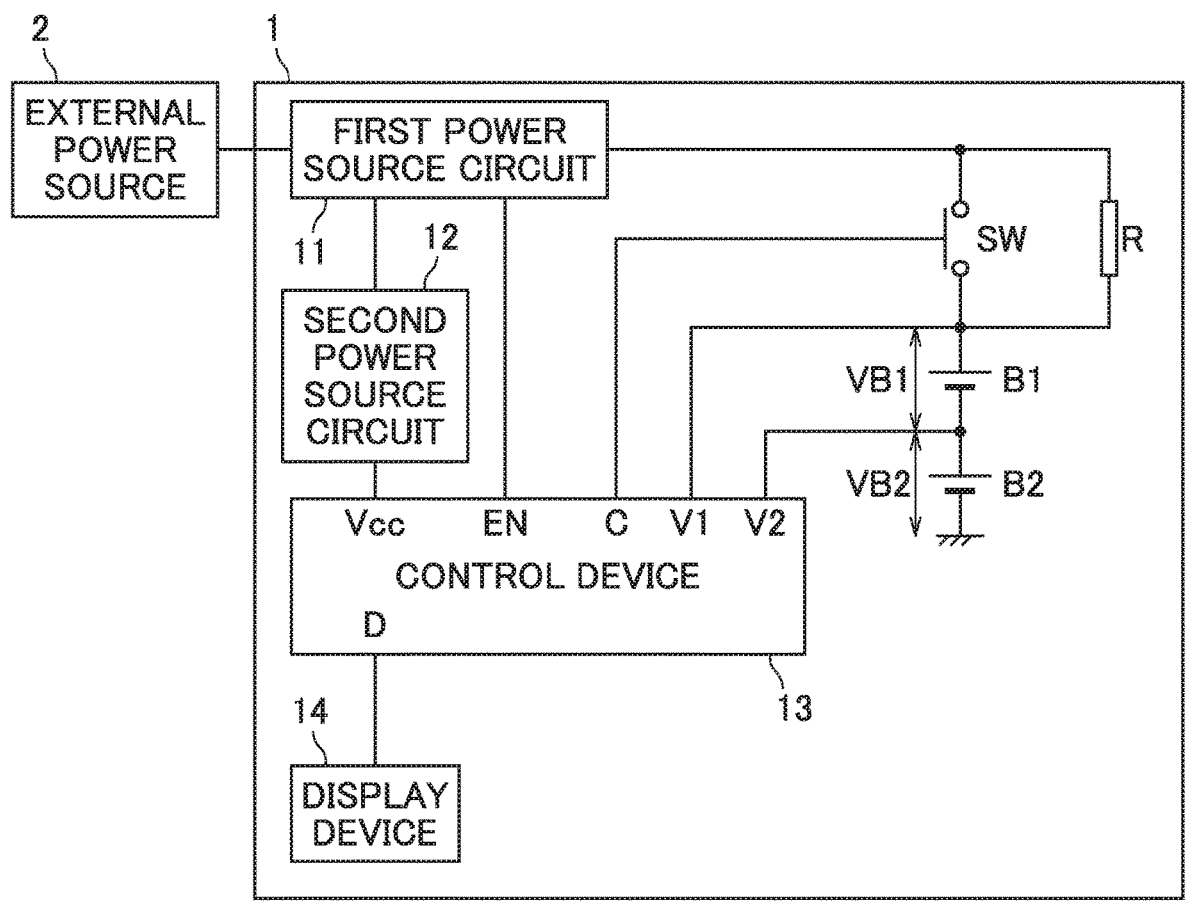
FIG. 1 is a configuration diagram of a charging circuit according to the present disclosure.

An embodiment of the present disclosure will be described below with reference to the drawings. FIG. 1 is a configuration diagram of a charging circuit 1 according to the present disclosure.

The charging circuit 1 may be, for example, a battery charger as equipment for charging multiple secondary batteries, or may be, for example, a circuit incorporated in an electronic device in order to charge the multiple secondary batteries that are built in or loaded into the electronic device. The charging circuit 1 is connected to an external power source 2 to thereby receive power required for the charging from the external power source 2. Here, the power output from the external power source 2 may be direct-current power or alternating-current power.

The charging circuit 1 includes a first power source circuit 11, a second power source circuit 12, a control device 13, a display device 14, a switch SW, a resistance R, and two secondary batteries B1, B2.

The first power source circuit 11 as "power source circuit," for example, is a DC-DC converter, and converts the power received from the external power source 2 into voltages suitable for charging the secondary batteries B1, B2. Moreover, if the external power source 2 is an alternating-current power source, the first power source circuit 11 may be configured with an AC-DC converter that converts the received alternating-current power into the direct-current power and outputs the direct-current power. The first power source circuit 11 is further connected to the second power source circuit 12, and also outputs the direct-current power to the second power source circuit 12.

The second power source circuit 12, for example, is a 3-terminal regulator, and converts the direct-current power received from the first power source circuit 11 into a voltage suitable for a power source of the control device 13, and outputs the voltage to a power source terminal Vcc of the control device 13.

The control device 13 is a publicly known microcomputer control circuit, and is connected to the first power source circuit 11, the display device 14, and the switch SW, respectively. The control device 13 detects respective voltage values of the secondary batteries B1, B2, and controls the switch SW based on the detected respective voltage values of the secondary batteries B1, B2, as will be described in detail later.

The display device 14, for example, is an LED, and displays whether or not the secondary batteries B1, B2 are being charged.

The switch SW is a switching element provided between the secondary batteries B1, B2, which are serially connected, and the first power source circuit 11. ON/OFF of the switch SW is switched by a control signal output from a C terminal of the control device 13, so as to control ON/OFF of power supply to the secondary batteries B1, B2.

The resistance R is connected to the switch SW in parallel, and is provided to detect that the secondary batteries B1, B2 are loaded into the charging circuit 1.

The secondary batteries B1, B2 are alkaline storage batteries that are serially charged by the charging circuit 1. The secondary battery B1 has one end connected to the switch SW and the resistance R, and the other end connected to one end of the secondary battery B2. Moreover, the secondary battery B2 has the other end connected to a ground line. Here, the control device 13 detects a voltage value V2 at a point of connecting the secondary batteries B1 and B2, as a voltage value VB2 of the secondary battery B2, and also detects a voltage value VB1 of the secondary battery B1 from a difference between a voltage value V1 of one end of the secondary battery B1 and the voltage value V2.

Figure 2:
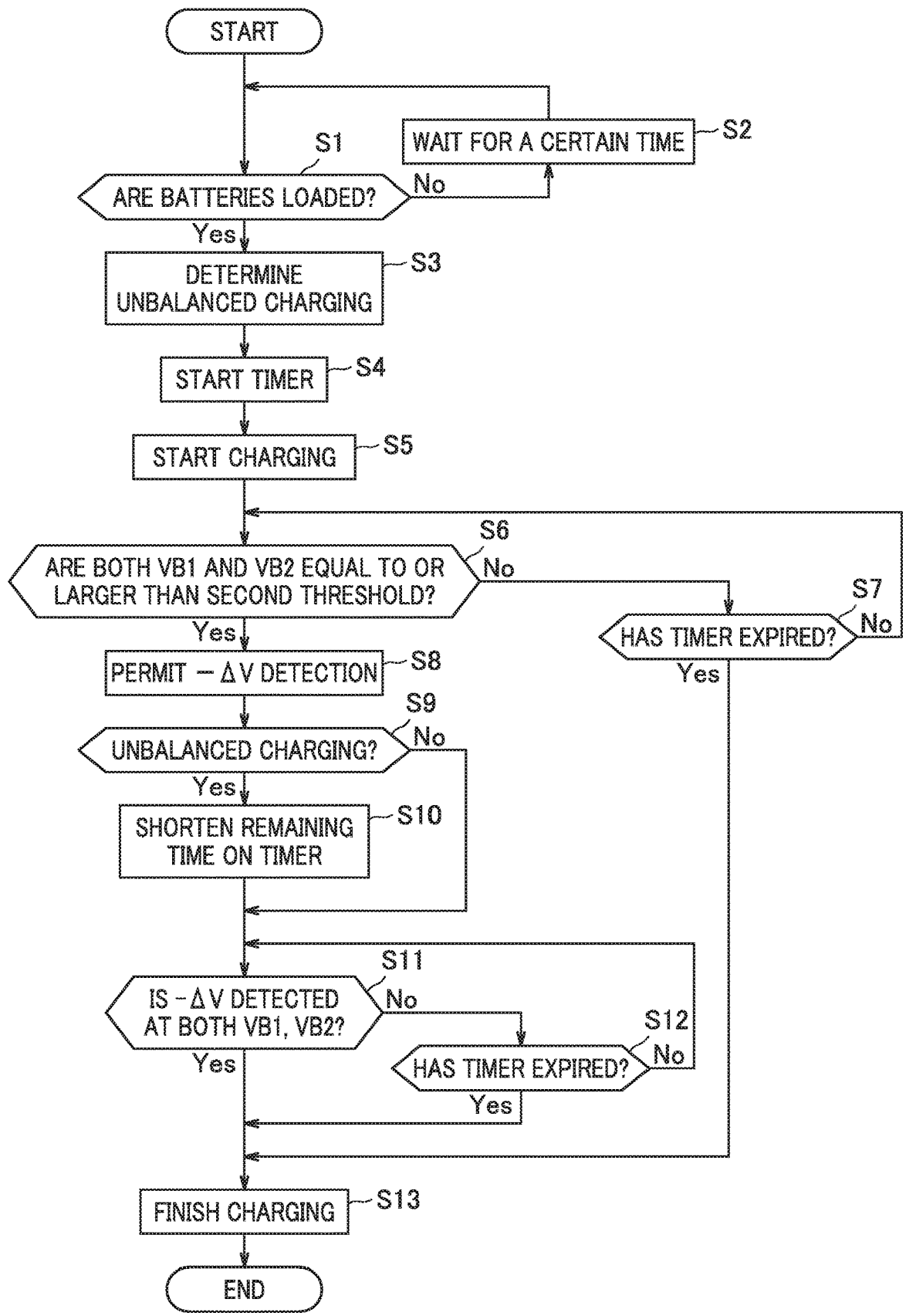
FIG. 2 is a flowchart illustrating control of the charging circuit according to the present disclosure.

Operations of the control device 13 will be described next with reference to FIG. 2. FIG. 2 is a flowchart illustrating control of the charging circuit according to the present disclosure.

The control device 13 starts the operations when the charging circuit 1 is connected to the external power source 2 and the power is supplied. At a time point of starting the operations, the control device 13 sets a control signal output from an EN terminal to OFF, and thereby controls the first power source circuit 11 in order not to supply charging power therefrom. Moreover, at the time point of starting the operations, the control device 13 sets the control signal output from the C terminal to OFF, and thereby controls the switch SW to be in an OFF state.

When the operations start, the control device 13 determines whether or not the secondary batteries B1, B2 have both been loaded into the charging circuit 1 (step S1). More specifically, the control device 13 first sets the control signal output from the EN terminal to ON, and thereby causes the charging power to be output from the first power source circuit 11. At this time, if the secondary batteries B1, B2 have not been loaded into the charging circuit 1, the voltage value detected as the voltage value V1 becomes no-load voltage applied via the resistance R. In contrast, if the secondary batteries B1, B2 have been loaded into the charging circuit 1, the voltage value detected as the voltage value V1 becomes a voltage (VB1+VB2) of the secondary batteries B1, B2. The control device 13 can thus determine whether or not the secondary batteries B1, B2 have been loaded, from the voltage value detected as the voltage value V1.

If it is determined that the secondary batteries B1, B2 have not been loaded into the charging circuit 1 (No in step S1), the control device 13 sets the control signal output from the EN terminal to OFF once, waits for a certain time (step S2), and then returns to step S1 again to perform the determination of the loading of the batteries. In other words, the control device 13 repeats steps S1 and S2 until the secondary batteries B1, B2 are loaded into the charging circuit 1.

If it is determined that the secondary batteries B1, B2 have been loaded into the charging circuit 1 (Yes in step S1), the control device 13 determines whether or not there is a difference in charged amounts of the secondary batteries B1, B2 before the charging, that is, whether or not the charging is unbalanced (step S3). More specifically, the control device 13 compares the voltage value VB1 of the secondary battery B1 with the voltage value VB2 of the secondary battery B2, and if a difference therebetween is equal to or larger than a first threshold, the control device 13 determines that the charging is unbalanced. Here, the first threshold is a threshold for a voltage difference, and is preset in order to determine whether or not there is the voltage difference equal to or larger than a certain amount, in the charged amounts of the secondary batteries B1, B2 before the charging. At a time point in step S3, the control device 13 holds a result of the determination of the unbalanced charging.

The control device 13 next starts a timer for setting an upper limit of a charging time (step S4). The control device 13 also sets the control signal output from the C terminal to ON, thereby controls the switch SW to be switched from OFF to ON, and starts the serial charging of the secondary batteries B1, B2 (step S5). At this time, the display device 14 displays that the secondary batteries B1, B2 are being charged, for example, by turning on the LED or the like, based on a signal output from a D terminal of the control device 13.

The control device 13 subsequently determines whether or not the voltage value VB1 of the secondary battery B1 and the voltage value VB2 of the secondary battery B2 have both become equal to or larger than a second threshold (step S6). Here, the second threshold is a threshold for determining whether or not the respective secondary batteries B1, B2 have reached a minimum charged amount to be secured through the charging, and is preset as the voltage values of the secondary batteries B1, B2 in the case where that charged amount has been reached.

If either one of or both the voltage value VB1 of the secondary battery B1 and the voltage value VB2 of the secondary battery B2 are less than the second threshold (No in step S6), the control device 13 determines whether or not the timer has expired (step S7). Then, if the control device 13 determines that the timer has expired (Yes in step S7), the control device 13 finishes the charging in step S13 to be described later. If the control device 13 determines that the timer has not expired (No in step S7), the control device 13 returns to step S6 again, and determines whether or not the voltage value VB1 of the secondary battery B1 and the voltage value VB2 of the secondary battery B2 have both become equal to or larger than the second threshold. In other words, the control device 13 continues the charging until the secondary batteries B1, B2 both reach the minimum charged amount to be secured, unless the timer expires earlier.

The alkaline storage batteries are generally known to have the voltage value that increases as the charging advances, and to exhibit a voltage peak when the alkaline storage batteries are fully charged. Thus, it can be determined that the alkaline storage batteries have been fully charged, by detecting a voltage drop (−ΔV detection) immediately after this peak. In this embodiment, if it is determined that the secondary batteries B1, B2 have both become equal to or larger than the second threshold (Yes in step S6), the control device 13 permits the −ΔV detection for the secondary batteries B1, B2 (step S8).

The control device 13 next confirms the result of the determination of the unbalanced charging in step S3 before starting the charging (step S9). Then, in the case of the unbalanced charging (Yes in step S9), the control device 13 shortens a remaining time on the timer at this time point (step S10).

There are various possible aspects of a method of setting an amount of time on the timer to be shortened in step S10. For example, a certain amount to be shortened may be set, or the amount of time on the timer to be shortened may be set as a ratio to the remaining time on the timer, such as shortening the remaining time on the timer by 50%. Moreover, the amount of time on the timer to be shortened is preferably set based on the voltage difference between the secondary batteries B1, B2 before the charging. Here, the difference in the charged amounts of the secondary batteries B1, B2 before the charging can be inferred from the magnitude of the voltage difference between the secondary batteries B1, B2 before the charging. Thus, by setting the amount of time on the timer to be shortened depending on the voltage difference between the secondary batteries B1, B2, even if the secondary battery B1 or B2 is put into an overcharged state, the charging can be finished by the timer so that the overcharged state does not continue for a long time. Furthermore, the amount of time on the timer to be shortened is preferably set within a range between an upper limit value and a lower limit value, which have been preset. In other words, setting the upper limit value to the amount of time on the timer to be shortened can prevent a remaining time on the timer from being too short, and thus can avoid the timer expiration before the secondary batteries are not sufficiently charged. Moreover, setting the lower limit value to the amount of time on the timer to be shortened can prevent the remaining time on the timer from being too long, and thus can more precisely inhibit degradation due to the overcharged state of the secondary battery B1 or B2.

In contrast, if it is confirmed that the charging is not unbalanced in step S9 (No in step S9), the control device 13 continues the charging without changing the time on the timer.

The control device 13 next determines whether or not −ΔV has been detected at the voltage value VB1 of the secondary battery B1 and the voltage value VB2 of the secondary battery B2, that is, whether or not the secondary battery B1 and the secondary battery B2 have both been fully charged (step S11). Then, if the control device 13 determines that the secondary battery B1 and the secondary battery B2 have both been fully charged (Yes in step S11), the control device 13 proceeds to step S13 at that time point and finishes the charging.

In step S11, if at least one of the secondary battery B1 or the secondary battery B2 has not been fully charged (No in step S11), the control device 13 determines whether or not the timer has expired (step S12). Then, if the control device 13 determines that the timer has expired (Yes in step S12), the control device 13 proceeds to step S13 at that time point and finishes the charging. Moreover, if the control device 13 determines that the timer has not expired (No in step S12), the control device 13 returns to step S11 again, and determines whether or not the secondary battery B1 and the secondary battery B2 have both been fully charged. In other words, the control device 13 finishes the charging at the earlier of a time point when the secondary batteries B1, B2 are both fully charged, or a time point when the timer expires.

The control device 13 finishes the serial charging of the secondary batteries B1, B2, specifically through the following control (step S13). The control device 13 sets the control signal output from the C terminal to OFF, and thereby switches the switch SW from ON to OFF, and also sets the control signal output from the EN terminal to OFF, and thereby stops the charging power output from the first power source circuit 11 to the secondary batteries B1, B2. Moreover, at this time, the display device 14 stops the display (for example, turns off the LED) indicating that the secondary batteries B1, B2 are being charged, based on the signal output from the D terminal of the control device 13. Thereby the charging circuit 1 completes a series of charging operations.

As described above, the control device 13 determines whether or not the charging is unbalanced, by detecting the voltage difference between the secondary batteries B1, B2 before the charging, by the control device 13 of the charging circuit 1; and charges the secondary batteries B1, B2 until the minimum charged amount to be secured is reached, unless the timer expires earlier. Then, on the condition that the charging is unbalanced, the control device 13 shortens the remaining time on the timer at the time point when the secondary batteries B1, B2 have both reached that charged amount. In this case, the serial charging of the secondary batteries B1, B2 is finished by the timer before the secondary batteries B1, B2 are both fully charged. Thereby, the secondary battery with a smaller charged amount before the charging, which is either one of the secondary battery B1 or the secondary battery B2, will not be charged to a fully charged state. In contrast, for the secondary battery with a larger charged amount before the charging, a time duration for which the overcharged state continues after the secondary battery is put into the overcharged state will be shortened, and thus the degradation will be inhibited. Moreover, as previously described, the charging circuit 1 requires just one switch as a configuration for serially charging the secondary batteries B1, B2, and can thereby simplify a circuit configuration with a reduced manufacturing cost.

In this way, according to the present disclosure, it is possible to provide, at low cost, a charging circuit that inhibits the degradation due to the overcharge even if the multiple secondary batteries with different charged amounts are serially charged.

While the embodiment has been described above, the present invention is not limited to the above described embodiment. For example, in the above described embodiment, there may be three or more secondary batteries to be serially charged. Furthermore, in the above described embodiment, at the time point of determining whether or not the charging is unbalanced (step S3), on the condition that the respective voltage values of the secondary batteries B1, B2 before the charging, or the voltage difference therebetween is extremely large, the control device 13 can cancel the charging and also cause the display device 14 to display the cancel. Thereby, for example, it is possible to prevent any unintended defect that may occur if all of the loaded secondary batteries already have sufficient charged amounts before the charging, or in such a case where the only one of the secondary batteries is already in the fully charged state before the charging.

EXPLANATION OF REFERENCE SIGNS 1 charging circuit
2 external power source
11 first power source circuit
12 second power source circuit
13 control device
14 display device
B1, B2 secondary battery
SW switch
R resistance

The invention claimed is:
1. A charging circuit, comprising:
  a power source circuit that supplies charging power to multiple secondary batteries;
  a switch that controls the supply of the charging power from the power source circuit to the multiple secondary batteries; and a control device that performs switching control of the switch based on respective voltage values of the multiple secondary batteries, wherein:

the control device detects a voltage difference among the multiple secondary batteries before starting charging;

the control device starts a timer for setting an upper limit of a total charging time, and starts serial charging of the multiple secondary batteries;

in a condition that the voltage difference among the multiple secondary batteries before the charging is equal to or larger than a first threshold, if the respective voltage values of the multiple secondary batteries all become equal to or larger than a second threshold before the timer expires, the control device shortens a remaining time on the timer at that time point; and the control device finishes the serial charging of the multiple secondary batteries at the earlier of a time point when the multiple secondary batteries have all become fully charged, or a time point when the timer has expired.

2. The charging circuit according to claim 1, wherein the control device sets an amount of the remaining time on the timer to be shortened, based on the voltage difference among the multiple secondary batteries before the charging.

3. The charging circuit according to claim 1, wherein the control device sets an amount of the remaining time on the timer to be shortened, within a range between an upper limit value and a lower limit value that have been preset.

4. The charging circuit according to claim 2, wherein the control device sets the amount of the remaining time on the timer to be shortened, within a range between an upper limit value and a lower limit value that have been preset.

5. The charging circuit according to claim 1, wherein the control device is configured to shorten the amount of time remaining on the timer without changing the charging power supplied to the multiple secondary batteries.

* * * * *